(12) United States Patent
Wei et al.

(10) Patent No.: US 12,736,439 B2
(45) Date of Patent: Sep. 15, 2026

(54) EXPERIMENTAL SYSTEM AND METHOD FOR SIMULATING A GEAR TRANSMISSION OF AN ELECTRIC MULTIPLE UNIT UNDER WHEEL-RAIL EXCITATION

(71) Applicant: CHONGQING UNIVERSITY, Chongqing (CN)

(72) Inventors: Jing Wei, Chongqing (CN); Hao Yuan, Chongqing (CN); Hao Wu, Chongqing (CN)

(73) Assignee: CHONGQING UNIVERSITY, Chongqing (CN)

( * ) Notice: Subject to any disclaimer, the term of this patent is extended or adjusted under 35 U.S.C. 154(b) by 345 days.

(21) Appl. No.: 18/685,387

(22) PCT Filed: Dec. 21, 2023

(86) PCT No.: PCT/CN2023/140653
§ 371 (c)(1),
(2) Date: Feb. 21, 2024

(87) PCT Pub. No.: WO2024/212580
PCT Pub. Date: Oct. 17, 2024

(65) Prior Publication Data

US 2025/0237576 A1 Jul. 24, 2025

(30) Foreign Application Priority Data

Apr. 10, 2023 (CN) ........................ 202310370635.X

(51) Int. Cl.
*G01M 13/026* (2019.01)
*G01M 13/021* (2019.01)
(Continued)

(52) U.S. Cl.
CPC ........ *G01M 13/026* (2013.01); *G01M 13/021* (2013.01); *G01M 13/028* (2013.01); *G01M 17/08* (2013.01)

(58) Field of Classification Search
CPC .................................................. G01M 13/026
(Continued)

(56) References Cited

FOREIGN PATENT DOCUMENTS

CN 209170837 U * 7/2019
CN 115791225 A * 3/2023

OTHER PUBLICATIONS

Yang et al. Machine Translation of CN-209170837-U. Published Jul. 2019. Accessed Mar. 2026. (Year: 2019).*
(Continued)

*Primary Examiner* — Walter L Lindsay, Jr.
*Assistant Examiner* — Philip T Fadul
(74) *Attorney, Agent, or Firm* — Myers Wolin, LLC

(57) ABSTRACT

An experimental system and a method for simulating a gear transmission of an electric multiple unit under wheel-rail excitation are provided. The experimental system includes a gear transmission experimental table and an excitation device. Under the action of the excitation device, the electric multiple unit gear transmission experimental table carries out no-load and load experiments of a gear transmission system to simulate the dynamic characteristic change of the gear transmission system under the wheel-rail excitation environment. The basic experiments of the gear transmission system of the electric multiple unit can be carried out, the wheel-rail excitation received by the gear transmission system during operation of the electric multiple unit can also be simulated, thus making up the vacancy of the experimental researches in the field of electric multiple unit transmission considering the environmental conditions of wheel-rail excitation in China.

6 Claims, 4 Drawing Sheets

(51) Int. Cl.
*G01M 13/028* (2019.01)
*G01M 17/08* (2006.01)

(58) Field of Classification Search
USPC ........................................................... 73/162
See application file for complete search history.

(56) References Cited

OTHER PUBLICATIONS

Niu et al. "Design and Analysis the Model of Reliability Testing Equipment of High-Speed Train Transmission System." Chinese Master's Theses Full-text Database, Engineering Science and Technology II, No. 09, 15 Sep. 2012, ISSN: 1674-0246, p. 1-40. Translated Mar. 2026. (Year: 2012).*

Zhang et al. Machine translation of CN 115791225 A. Published Mar. 2023. Accessed Jun. 2025. (Year: 2023).*

* cited by examiner

EXPERIMENTAL SYSTEM AND METHOD FOR SIMULATING A GEAR TRANSMISSION OF AN ELECTRIC MULTIPLE UNIT UNDER WHEEL-RAIL EXCITATION

CROSS-REFERENCE TO RELATED APPLICATION

This patent application is a national stage application of International Patent Application No. PCT/CN2023/140653, filed on Dec. 21, 2023, which claims priority of Chinese Patent Application No. 202310370635.X, filed on Apr. 10, 2023, both of which are incorporated by references in their entities.

TECHNICAL FIELD

The present disclosure relates to the technical field of gear transmission, in particular to an experimental system and method for simulating a gear transmission of an electric multiple unit under wheel-rail excitation.

BACKGROUND

As a key component of the vehicle, a gear transmission system of an electric multiple unit plays a vital role in the safe operation of the electric multiple unit. When the electric multiple unit is running, the gear transmission system is excited by external factors such as wheel polygon and track irregularity, resulting in an increase in a failure rate of the gear transmission system. Therefore, researches on the gear transmission system of the electric multiple unit have practical engineering significance.

At present, a large number of researches have been carried out on the gear transmission system of the electric multiple unit and many achievements have been made in China. The developed simulated gear transmission system can carry out no-load load experiments, but cannot simulate the wheel-rail excitation environment.

Therefore, it is of great significance to develop an experimental system and method for simulating a gear transmission of an electric multiple unit under wheel-rail excitation.

SUMMARY

The purpose of the present disclosure is to provide an experimental system and method for simulating a gear transmission of an electric multiple unit under wheel-rail excitation so as to solve the problems in the prior art.

In order to achieve the purpose in the present disclosure, the following technical solution is proposed: an experimental system for simulating a gear transmission of an electric multiple unit under wheel-rail excitation, including a platform base plate, a gear transmission experimental table and an excitation device.

The gear transmission experimental table includes a load motor and a drive motor which are arranged on both sides of a gear transmission system. A double-cross splined universal coupling I and a bearing seat I are arranged between the load motor and the gear transmission system in sequence. A plum coupling, a torque and speed sensor, a double-cross splined universal coupling II, and a bearing seat II are arranged between the drive motor and the gear transmission system in sequence.

The gear transmission experimental table is arranged on an upper surface of the platform base plate. The excitation device is arranged below the platform base plate.

During operation, power is transmitted to the gear transmission system by the drive motor. Vibration signals input and output during operation of the drive motor are acquired by the torque and speed sensor. A load torque is applied to the gear transmission system by the load motor. Sinusoidal excitation is output by the excitation device according to a frequency required by an experiment along a vertical direction to knock the platform base plate, and the wheel-rail excitation received by the gear transmission system during operation of the electric multiple unit is simulated. A dynamic response and a dynamic stress of the gear transmission system are acquired.

Further, the experimental system also includes a motor support I and a motor support II. The motor support I and the motor support II are both mounted on the upper surface of the platform base plate. The load motor is mounted on the motor support I. The drive motor is mounted on the motor support II.

Further, the experimental system also includes a gear transmission system suspension device. The gear transmission system suspension device includes a suspension support frame, a hanger rod, and a connecting plate.

Further, the bearing seat I includes guide sleeves I, guide posts I, a bearing seat body I, an M5 threaded hole, guide posts II, guide sleeves II, bearing support plates I, a spring I, a spring limiting plate I, and an M10 connecting rod I. The M5 threaded hole is configured for mounting an acceleration sensor to acquire vibration signals during operation of the load motor and transmit the signals to a control system. The mechanisms such as the guide sleeves I, the guide sleeves II, the guide posts I and the guide posts II are configured for limiting the bearing seat I to move only in a direction perpendicular to a surface of the experimental table. The spring I is configured for counteracting weight of the bearing seat body I and load thereof. The M10 connecting rod I is configured for connecting with a vibration exciter I.

Further, the bearing seat II includes guide sleeves III, guide posts III, a bearing seat body II, an M5 threaded hole, guide posts IV, guide sleeves IV, bearing support plates II, a spring I, a spring limiting plate II, and an M10 connecting rod II. The M5 threaded hole is configured for mounting an acceleration sensor to acquire vibration signals during operation of the load motor and transmit the signals to a control system. The mechanisms such as the guide sleeves III, the guide sleeves IV, the guide posts III and the guide posts IV are configured for limiting the bearing seat II to move only in a direction perpendicular to a surface of the experimental table. The spring II is configured for counteracting weight of the bearing seat body II and load thereof. The M10 connecting rod II is configured for connecting with a vibration exciter II.

The present disclosure further provides an experimental method for simulating no-load dynamic characteristics of a gear transmission system of an electric multiple unit in a wheel-rail excitation environment with the above experimental system, including the following steps:

- connecting all parts of the experimental system and checking whether connections of all parts are stable;
- driving the gear transmission system to forward idle and reverse idle for 10 minutes each at 50% of a rated speed, observing whether there is any abnormal noise in the gear transmission system, and determining whether the gear transmission system operates normally;
- mounting sensors at set positions, and checking whether signals are acquired by all the sensors normally;
- starting the excitation device;

starting the drive motor, setting an input shaft to rotate counterclockwise, and gradually increasing a speed of the motor to a speed required by an experiment; starting the load motor, setting a rated load torque of the load motor to zero;

during acceleration of the motor, recording a vibration acceleration, a vibration displacement and stress of the gear transmission system, as well as noise, a motor voltage, a motor current and a motor power;

starting the drive motor, setting the input shaft to rotate clockwise, and gradually increasing the speed of the motor to the speed required by the experiment; starting the load motor, setting the rated load torque of the load motor to zero;

during acceleration of the motor, recording the vibration acceleration, the vibration displacement and the stress of the gear transmission system, as well as the noise, the motor voltage, the motor current and the motor power;

The present disclosure further provides an experimental method for simulating load dynamic characteristics of a gear transmission system of an electric multiple unit in a wheel-rail excitation environment with the above experimental system, including the following steps:

connecting all parts of the experimental system and checking whether connections of all the parts are stable;

driving the gear transmission system to forward idle and reverse idle for 10 minutes each at 50% of a rated speed, observing whether there is any abnormal noise in the gear transmission system, and determining whether the gear transmission system operates normally;

mounting sensors at designated positions, and checking whether signals are acquired by all the sensors normally;

starting the vibration exciter I and the vibration exciter II, and thus frequencies of the vibration exciters are increased to frequencies required by an experiment;

starting a drive motor, setting the input shaft to rotate counterclockwise, and keeping the rated speed unchanged according to requirements of the experiment; starting the load motor, and applying a load torque required by the experiment to the gear transmission system by the load motor;

recording a vibration acceleration, a vibration displacement and stress, as well as noise, a motor voltage, a motor current and a motor power under different load torques;

starting the drive motor, setting the input shaft to rotate clockwise, and keeping the rated speed unchanged according to requirements of the experiment; starting the load motor, and applying the load torque required by the experiment to the gear transmission system by the load motor;

recording the vibration acceleration, the vibration displacement and the stress, as well as the noise, the motor voltage, the motor current and the motor power under different load torques;

starting the drive motor, setting the input shaft to rotate counterclockwise, and keeping rated load torque unchanged according to requirements of the experiment; starting the drive motor, and enabling the drive motor to run at designated speeds increasing gradually;

recording the vibration acceleration, the vibration displacement and the stress, as well as the noise, the motor voltage, the motor current and the motor power under different speeds;

starting the load motor, setting the input shaft to rotate clockwise, and keeping the rated load torque unchanged according to requirements of the experiment; starting the drive motor, and enabling the drive motor to run at the designated speeds increasing gradually;

recording the vibration acceleration, the vibration displacement and the stress, as well as the noise, the motor voltage, the motor current and the motor power under different speeds;

starting the load motor, setting the input shaft to rotate counterclockwise, and recording the vibration acceleration, the vibration displacement, temperature and the stress, as well as the noise, the motor voltage, the motor current and the motor power at a rated load from a moment that the system is started to a moment that the system operates stably; and starting the load motor, setting the input shaft to rotate clockwise, and recording the vibration acceleration, the vibration displacement, the temperature and the stress, as well as the noise, the motor voltage, the motor current and the motor power at the rated load from the moment that the system is started to the moment that the system operates stably.

The technical effects of present disclosure are undoubted.

A. The bearing seats of the system are unfixed. When the bearing seats are excited by the vibration exciters, the springs in the bearing seats drive the bearing seats to move together, so that the working situation of the gear transmission system can be simulated more truly.

B. The wheel-rail excitation environment can be simulated truly, and the service environment of the gear transmission system of the electric multiple unit under the action of wheel polygon and track irregularity are simulated by applying high-frequency excitation and random excitation through two vibration exciters.

C. The basic experiments of the gear transmission system of the electric multiple unit can be carried out, the wheel-rail excitation received by the gear transmission system during operation of the electric multiple unit can also be simulated, thus making up the vacancy of the experimental researches in the field of electric multiple unit transmission considering the environmental conditions of wheel-rail excitation in China.

REFERENCE SIGNS

1 platform base plate; 2 vibration exciter support plate I; 3 vibration exciter I; 4 load motor; 5 motor support I; 6 double-cross splined universal coupling I; 7 bearing seat I; 701 guide sleeve I; 702 guide post I; 703 bearing seat body I; 704 M5 threaded hole; 705 guide post II; 706 guide sleeve II; 707 bearing support plate I; 708 spring I; 709 spring limiting plate I; 710 M10 connecting rod I; 8 gear transmission system; 9 bearing seat II; 901 guide sleeve III; 902 guide post III; 903 bearing seat body II; 904 M5 threaded hole; 905 guide post IV; 906 guide sleeve IV; 907 bearing support plate II; 908 spring II; 909 spring limiting plate II; 910 M10 connecting rod; 10 gear transmission system suspension device; 1001 suspension support frame; 1002 hanger rod; 1003 connecting plate; 11 double-cross splined universal coupling II; 12 torque and speed sensor; 13 plum coupling; 14 drive motor; 15 motor support II; 16 vibration exciter II; and 17 vibration exciter support plate II.

DETAILED DESCRIPTION OF THE EMBODIMENTS

The present disclosure is further illustrated by the following embodiments, which are not to be construed as limiting the scope of the present disclosure. Various substitutions and alterations are intended to be included within the scope of the present disclosure in accordance with the general technical knowledge and customary means in the art without departing from the above technical idea of the present disclosure.

Embodiment I

Figure 1:
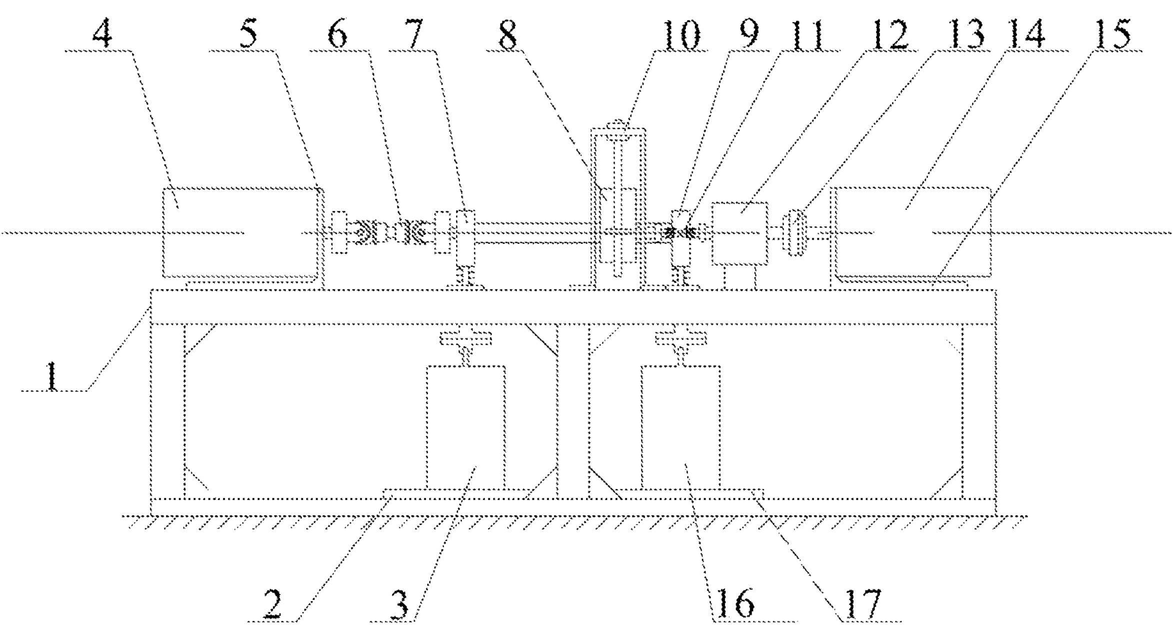
FIG. 1 is a front view of an experimental system according to an embodiment of the present disclosure.
Figure 2:
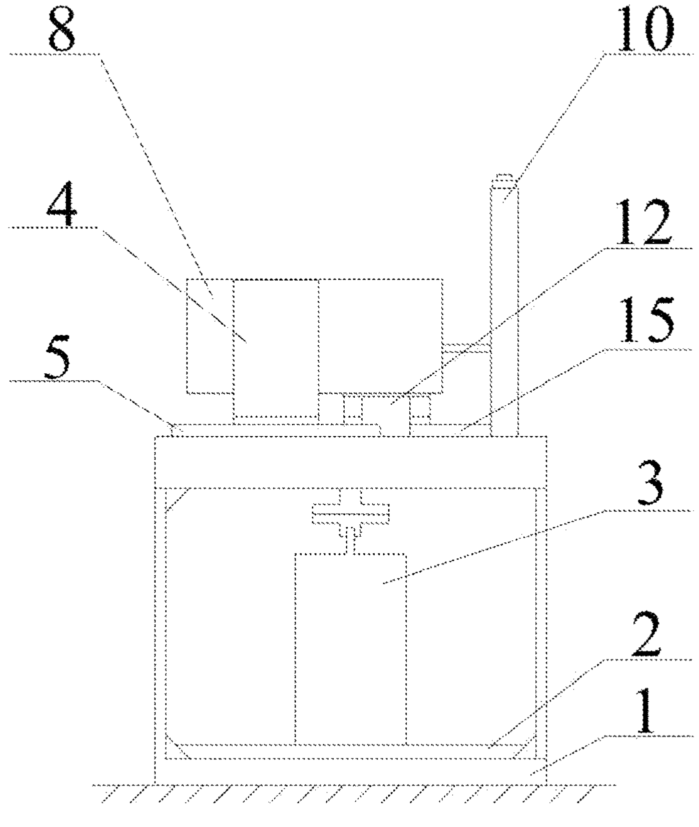
FIG. 2 is a left view of the experimental system according to an embodiment of the present disclosure.
Figure 3:
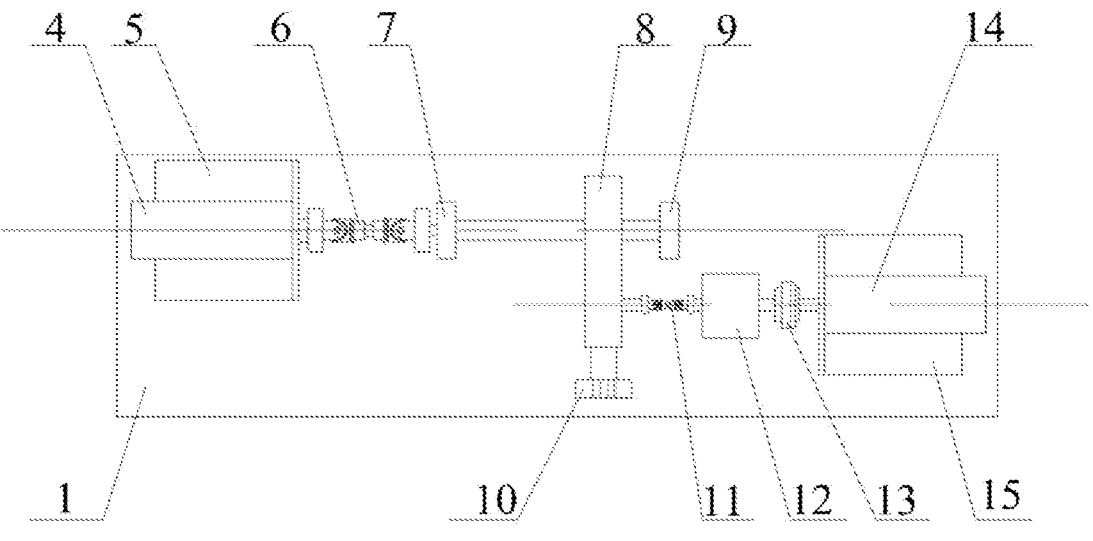
FIG. 3 is a top view of the experimental system according to an embodiment of the present disclosure.

Referring to FIG. 1, FIG. 2 and FIG. 3, in order to research dynamic characteristics of a gear transmission system of an electric multiple unit under wheel-rail excitation environment more truly, the embodiment provides an experimental system for simulating a gear transmission of an electric multiple unit under wheel-rail excitation. The experimental system includes a platform base plate 1, a vibration exciter support plate I 2, a vibration exciter I 3, a load motor 4, a motor support I 5, a double-cross splined universal coupling I 6, a bearing seat I 7, a gear transmission experimental table, and an excitation device.

The gear transmission experimental table includes the load motor 4 and a drive motor 14 which are arranged on both sides of a gear transmission system 8. The double-cross splined universal coupling I 6 and the bearing seat I 7 are arranged between the load motor 4 and the gear transmission system 8 in sequence. A plum coupling 13, a torque and speed sensor 12, a double-cross splined universal coupling I 11, and a bearing seat II 9 are arranged between the drive motor 14 and the gear transmission system 8 in sequence.

The gear transmission experimental table is arranged on an upper surface of the platform base plate 1. The excitation device is arranged below the platform base plate 1.

During operation, power is transmitted to the gear transmission system 8 by the drive motor 14 through the plum coupling 13 and the double-cross splined universal coupling II 11. Vibration signals input and output during operation of the drive motor 14 are acquired by the torque and speed sensor 12 through the plum coupling 13. A load torque is applied to the gear transmission system 8 by the load motor 4 through the double-cross splined universal coupling I 6. Sinusoidal excitation is output by the excitation device according to a frequency required by an experiment along a vertical direction to knock the platform base plate 1, and the wheel-rail excitation received by the gear transmission system 8 during operation of the electric multiple unit is simulated. A dynamic response and a dynamic stress of the gear transmission system 8 are acquired.

Embodiment II

The main structure of the present embodiment is the same as that of embodiment I. The experimental system further includes a motor support I 5 and a motor support II 15. The motor support I 5 and the motor support II 15 are both mounted on the upper surface of the platform base plate 1. The load motor 4 is mounted on the motor support I 5. The drive motor 14 is mounted on the motor support II 15.

Embodiment III

Figure 6:
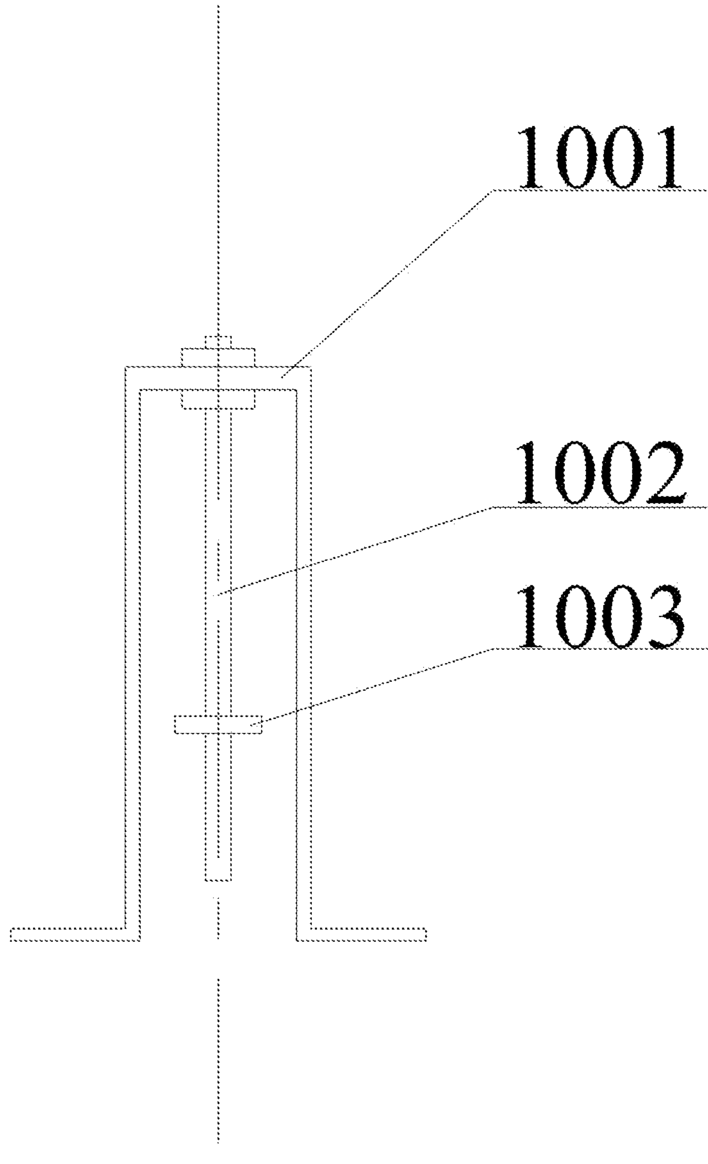
FIG. 6 is a front view of a suspension hanger rod according to an embodiment of the present disclosure.

Referring to FIG. 6, the main structure of the present embodiment is the same as that of embodiment I. The experimental system further includes a gear transmission system suspension device 10. The gear transmission system suspension device 10 includes a suspension support frame 1001, a hanger rod 1002, and a connecting plate 1003. The gear transmission system 8 is connected to the suspension support frame 1001 through the connecting plate 103. The suspension support frame 1001 is arranged on the upper surface of the platform base plate 1. The hanger rod 1002 is suspended on the suspension support frame 1001.

Embodiment IV

Figure 4:
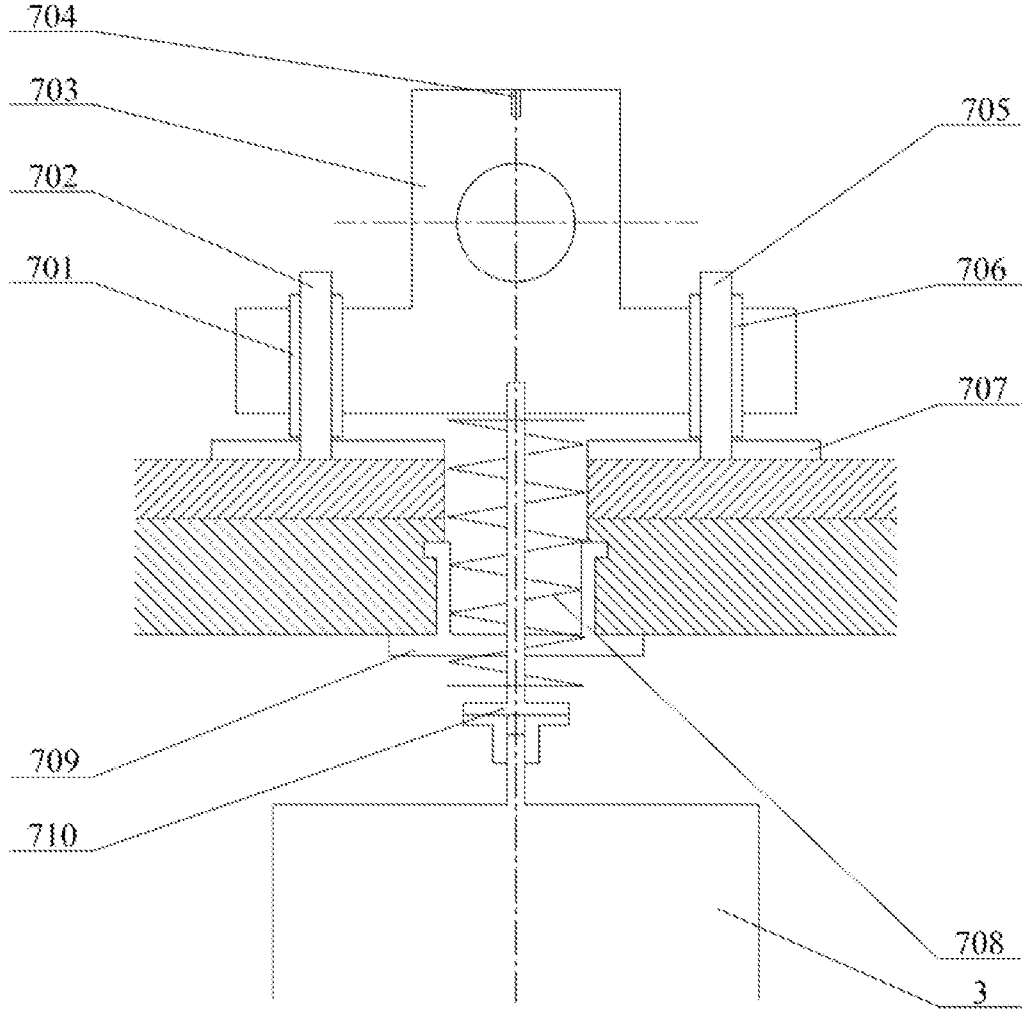
FIG. 4 is a left view of a bearing seat I according to an embodiment of the present disclosure.
Figure 5:
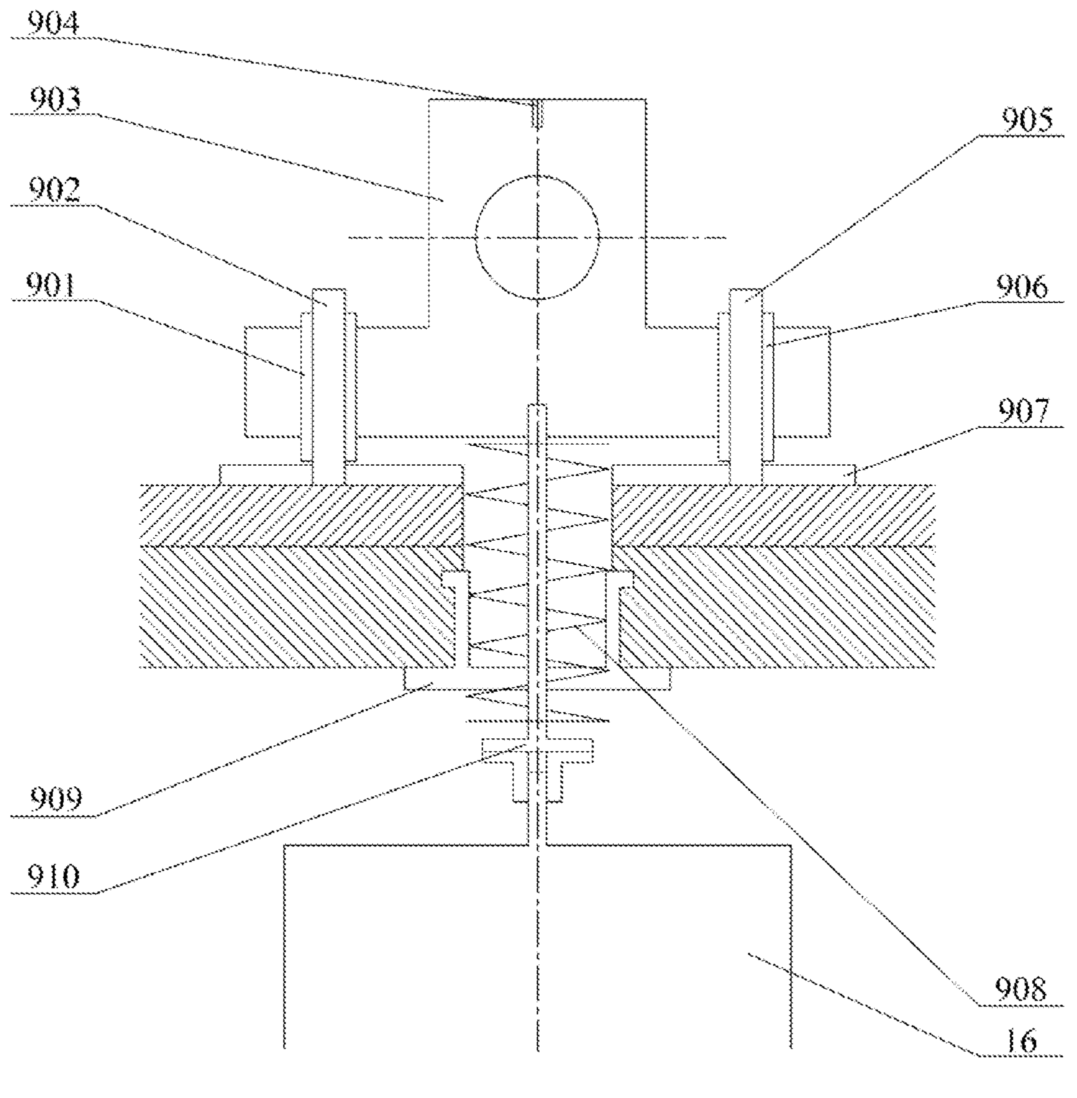
FIG. 5 is a left view of a bearing seat II according to an embodiment of the present disclosure.

Referring to FIG. 4 and FIG. 5, the main structure of the present embodiment is the same as that of embodiment I. The bearing seat I 7 includes guide sleeves I 701, guide posts I 702, a bearing seat body I 703, an M5 threaded hole 704, guide posts II 705, guide sleeves II 706, several bearing support plates I 707, a spring I 708, a spring limiting plate I 709, and a connecting rod I 710.

A spring accommodating hole is formed in the platform base plate 1 at a position where the bearing seat I 7 is arranged. A lower end of the spring accommodating hole is blocked by the spring limiting plate I 709.

The bearing support plates I 707 are arranged on the upper surface of the platform base plate 1. The bearing support plates I 707 are arranged around the spring accommodating hole. Each of the guide posts I 702 is fixedly arranged on a corresponding one of the bearing support plates I 707.

An acceleration sensor is mounted on an upper surface of the bearing seat body I 703 to acquire vibration signals during operation of the load motor 4 and transmit the signals to a control system. Several holes corresponding to positions of the guide posts I 702 are further formed in the bearing seat body 1703. The guide sleeves 1701 are respectively arranged in the holes. The bearing seat body I 703 is arranged above the spring accommodating hole. The guide posts I 702 are respectively inserted into the guide sleeves I 701 and configured for limiting the bearing seat body I 703 to move only in a direction perpendicular to a surface of the experimental table.

A lower end of the connecting rod I 710 is fixed with the excitation device, and an upper end of the connecting rod I 710 passes through the spring limiting plate I 709 and the spring accommodating hole, and is fixedly connected with the bearing seat body I 703. The spring I 708 is arranged in the spring accommodating hole. The spring I 708 is sleeved on a rod body of the connecting rod I 710. An upper end of the spring I 708 abuts against the bearing seat body I 703, and a lower end of the spring I 708 abuts against the spring limiting plate I 709. The spring I 708 is configured for counteracting weight of the bearing seat body I 703 and load thereof.

The bearing seat II 9 includes guide sleeves III 901, guide posts III 902, a bearing seat body II 903, an M5 threaded hole 904, guide posts IV 905, guide sleeves IV 906, several bearing support plates II 907, a spring II 908, a spring limiting plate II 909, and a connecting rod II 910.

A spring accommodating hole is formed in the platform base plate 1 at a position where the bearing seat II 9 is arranged. A lower end of the spring accommodating hole is blocked by the spring limiting plate II 909.

The bearing support plates II 907 are arranged on the upper surface of the platform base plate 1. The bearing support plates II 907 are arranged around the spring accommodating hole. Each of the guide posts II 902 is fixedly arranged on a corresponding one of the bearing support plates II 907.

A threaded hole 904 is formed in an upper surface of the bearing seat body II 903. The threaded hole 904 is configured for mounting an acceleration sensor to acquire vibration signals during operation of the load motor 4 and transmit the signals to a control system. Several holes corresponding to positions of the guide posts II 902 are further formed in the bearing seat body II 903. The guide sleeves II 901 are respectively arranged in the holes. The bearing seat body II 903 is arranged above the spring accommodating hole. The guide posts II 902 are respectively inserted into the guide sleeves II 901 and configured for limiting the bearing seat body II 903 to move only in a direction perpendicular to a surface of the experimental table.

A lower end of the connecting rod II 910 is fixed with the excitation device, and an upper end of the connecting rod II 910 passes through the spring limiting plate II 909 and the spring accommodating hole, and is fixedly connected with the bearing seat body II 903. The spring II 908 is arranged in the spring accommodating hole. The spring II 908 is sleeved on a rod body of the connecting rod II 910. An upper end of the spring II 908 abuts against the bearing seat body II 903, and a lower end of the spring II 908 abuts against the spring limiting plate II 909. The spring II 908 is configured for counteracting weight of the bearing seat body II 903 and load thereof.

Embodiment V

An experimental method for simulating no-load dynamic characteristics of a gear transmission system of an electric multiple unit in a wheel-rail excitation environment with the experimental system in embodiment IV is provided by the present embodiment, the method includes the following steps.

1), All parts of the experimental system are connected, and connections of all the parts are checked whether they are stable.

2), The gear transmission experimental table is debugged, the drive motor 14 is powered on, the gear transmission system is driven to forward idle and reverse idle for 10 minutes each at 50% of a rated speed, the gear transmission system is observed whether there is any abnormal noise therein, and the gear transmission system is determined whether it operates normally.

3), A temperature sensor is mounted at an oil tank of the gear transmission system 8, acceleration sensors are mounted at a top of the hanger rod, a hanger rod seat of the gear transmission system, a high-speed shaft bearing seat and a low-speed shaft bearing seat, an acceleration sensor is mounted at a large end cover at a front end of the drive motor 14, a stress-strain sensor is mounted at a designated position of the gear transmission system 8, and current sensors and voltage sensors are mounted at designated positions of the drive motor 14 and the load motor 4.

4), The vibration exciter I 3 and the vibration exciter II 16 are started, and frequencies of the vibration exciter I 3 and the vibration exciter II 16 are increased to frequencies required by an experiment.

5), The drive motor 14 is started, the input shaft is set to rotate counterclockwise, and a speed of the drive motor 14 is gradually increased to a speed required by an experiment; the load motor 4 is started, and a rated load torque of the load motor 4 is set to zero.

6), During acceleration of the drive motor 14, a vibration acceleration, a vibration displacement and stress of the gear transmission system 8, as well as noise, a motor voltage, a motor current and a motor power are recorded.

7), The drive motor 14 is started, the input shaft is set to rotate clockwise, and the speed of the drive motor 14 is gradually increased to the speed required by the experimental; the load motor 4 is started, and the rated load torque of the load motor 4 is set to zero.

8), During acceleration of the drive motor 14, the vibration acceleration, the vibration displacement, the stress of the gear transmission system 8, as well as the noise, the motor voltage, the motor current and the motor power are recorded.

9), The experimental system is shut down according to operating instructions of the experimental system.

Embodiment VI

An experimental method for simulating no-load dynamic characteristics of a gear transmission system of an electric multiple unit in a wheel-rail excitation environment with the experimental system in embodiment IV is provided by the present embodiment, the method includes the following steps:

1), All parts of the experimental system are connected, and connections of all the parts are checked whether they are stable.

2), The gear transmission experimental table is debugged, the drive motor 14 is powered on, the gear transmission system is driven to forward idle and reverse idle for 10 minutes each at 50% of rated speed, the gear transmission system is observed whether there is any abnormal noise therein, and the gear transmission system is determined whether it operates normally.

3), A temperature sensor is mounted at an oil tank of the gear transmission system 8, acceleration sensors are mounted at a top of the hanger rod, a hanger rod seat of the gear transmission system, a high-speed shaft bearing seat and a low-speed shaft bearing seat, an acceleration sensor is mounted at the position of a large end cover at a front end of the drive motor 14, a stress-strain sensor is mounted at a designated position of the gear transmission system 8, and current sensors and voltage sensors are mounted at designated positions of the drive motor 14 and the load motor 4.

4), The vibration exciter I 3 on the vibration exciter support plate I 2 and the vibration exciter II 16 on the vibration exciter support plate II 17 are started, and frequencies of the vibration exciter I 3 and the vibration exciter II 16 are increased to frequencies required by an experiment.

5), The drive motor 14 is started, the input shaft is set to rotate counterclockwise, and the rated speed of the drive motor 14 is kept unchanged according to requirements of the experiment; the load motor 4 is started, and a load torque required by the experiment is applied to the gear transmission system 8 by the load motor 4.

6), A vibration acceleration, a vibration displacement and stress of the gear transmission system 8, as well as noise, a motor voltage, a motor current and a motor power under different load torques are recorded.

7), The drive motor 14 is started, the input shaft is set to rotate clockwise, and the rated speed of the drive motor 14 is kept unchanged according to requirements of the experiment; the load motor 4 is started, and the load torque required by the experiment is applied to the gear transmission system 8 by the load motor 4.

8), the vibration acceleration, the vibration displacement and the stress of the gear transmission system 8, as well as the noise, the motor voltage, the motor current and the motor power under different load torques are recorded.

9), The load motor 4 is started, the input shaft is set to rotate counterclockwise, and the rated load torque of the drive motor 4 is kept unchanged according to requirements of the experiment; the drive motor 14 is started, and the drive motor 14 is enabled to run at designated speeds increasing gradually.

10), the vibration acceleration, the vibration displacement and the stress of the gear transmission system 8, as well as the noise, the motor voltage, the motor current and the motor power under different load torques are recorded.

11), The drive motor 4 is started, the input shaft is set to rotate clockwise, and the rated load torque of the drive motor 4 is kept unchanged according to requirements of the experiment; the drive motor 14 is started, and the drive motor 14 is enabled to run at the designated speed increasing gradually.

12), the vibration acceleration, the vibration displacement and the stress of the gear transmission system 8, as well as the noise, the motor voltage, the motor current and the motor power under different load torques are recorded.

13), The load motor 4 is started, the input shaft is set to rotate counterclockwise, and the vibration acceleration, the vibration displacement, temperature and the stress of the gear transmission system 8, as well as the noise, the motor voltage, the motor current and the motor power at a rated load of the load motor 4 from a moment that the gear transmission system 8 is started to a moment that the gear transmission system 8 operates stably are recorded.

14), The load motor 4 is started, the input shaft is set to rotate clockwise, and the vibration acceleration, the vibration displacement, the temperature and the stress, as well as the noise, the motor voltage, the motor current and the motor power at the rated load of the load motor 4 from the moment that the gear transmission system 8 is started to the moment that the gear transmission system 8 operates stably are recorded.

15), The experimental system is shut down according to operating instructions of the experimental system.

What is claimed is:

1. An experimental system for simulating a gear transmission of an electric multiple unit under wheel-rail excitation, comprising a platform base plate (1), a gear transmission experimental table, an excitation device, and a gear transmission system suspension device (10), wherein the gear transmission experimental table comprises a load motor (4) and a drive motor (14) which are arranged on both sides of a gear transmission system (8); a double-cross splined universal coupling I (6) and a bearing seat I (7) are arranged between the load motor (4) and the gear transmission system (8) in sequence; a plum coupling (13), a torque and speed sensor (12), a double-cross splined universal coupling II (11), and a bearing seat II (9) are arranged between the drive motor (14) and the gear transmission system (8) in sequence;

the gear transmission experimental table is arranged on an upper surface of the platform base plate (1); the excitation device is arranged below the platform base plate (1);

during operation, power is transmitted to the gear transmission system (8) by the drive motor (14) through the plum coupling (13) and the double-cross splined universal coupling II (11); vibration signals input and output during operation of the drive motor (14) are acquired by the torque and speed sensor (12) through the plum coupling (13); a load torque is applied to the gear transmission system (8) by the load motor (4) through the double-cross splined universal coupling I (6); sinusoidal excitation is output by the excitation device according to a frequency required by an experiment along a vertical direction to knock the platform base plate (1), and the wheel-rail excitation received by the gear transmission system (8) during operation of the electric multiple unit is simulated; and a dynamic response and a dynamic stress of the gear transmission system (8) are acquired;

the gear transmission system suspension device (10) comprises a suspension support frame (1001), a hanger rod (1002), and a connecting plate (1003); the suspension support frame (1001) is a door-type support frame; the suspension support frame (1001) comprises a cross beam and two upright posts; the suspension support frame (1001) is arranged on the upper surface of the platform base plate (1); the hanger rod (1002) is suspended below the cross beam; the connecting plate (1003) is fixedly connected with the hanger rod (1002); and the gear transmission system (8) is arranged on the connecting plate (1003).

2. The experimental system for simulating the gear transmission of the electric multiple unit under wheel-rail excitation according to claim 1, further comprising a motor support I (5) and a motor support II (15), wherein the motor support I (5) and the motor support II (15) are both mounted on the upper surface of the platform base plate (1); the load motor (4) is mounted on the motor support I (5); and the drive motor (14) is mounted on the motor support II (15).

3. The experimental system for simulating the gear transmission of the electric multiple unit under wheel-rail excitation according to claim 1, wherein the bearing seat I (7) comprises guide sleeves I (701), guide posts I (702), a bearing seat body I (703), several bearing support plates I (707), a spring I (708), a spring limiting plate I (709), and a connecting rod I (710);

a spring accommodating hole is formed in the platform base plate (1) at a position where the bearing seat I (7)

is arranged; a lower end of the spring accommodating hole is blocked by the spring limiting plate I (709);

the bearing support plates I (707) are arranged on the upper surface of the platform base plate (1); the bearing support plates I (707) are arranged around the spring accommodating hole; each of the guide posts I (702) is fixedly arranged on a corresponding one of the bearing support plates I (707);

an acceleration sensor is mounted on an upper surface of the bearing seat body I (703) to acquire vibration signals during operation of the load motor (4) and transmit the signals to a control system; several holes corresponding to positions of the guide posts I (702) are also formed in the bearing seat body I (703); the guide sleeves I (701) are respectively arranged in the holes; the bearing seat body I (703) is arranged above the spring accommodating hole; the guide posts I (702) are respectively inserted into the guide sleeves I (701);

a lower end of the connecting rod I (710) is fixed with the excitation device, and an upper end of the connecting rod I (710) passes through the spring limiting plate I (709) and the spring accommodating hole, and is fixedly connected with the bearing seat body I (703); the spring I (708) is arranged in the spring accommodating hole; the spring I (708) is sleeved on a rod body of the connecting rod I (710); an upper end of the spring I (708) abuts against the bearing seat body I (703), and a lower end of the spring I (708) abuts against the spring limiting plate I (709).

4. The experimental system for simulating the gear transmission of the electric multiple unit under wheel-rail excitation according to claim 1, wherein the bearing seat II (9) comprises guide sleeves III (901), guide posts III (902), a bearing seat body II (903), several bearing support plates II (907), a spring II (908), a spring limiting plate II (909), and a connecting rod II (910);

a spring accommodating hole is formed in the platform base plate (1) at a position where the bearing seat II (9) is arranged; a lower end of the spring accommodating hole is blocked by the spring limiting plate II (909);

the bearing support plates II (907) are arranged on the upper surface of the platform base plate (1); the bearing support plates II (907) are arranged around the spring accommodating hole;

each of the of the guide posts II (902) is fixedly arranged on a corresponding one of the bearing support plates II (907);

a threaded hole (904) is formed in an upper surface of the bearing seat body II (903); the threaded hole (904) is configured for mounting an acceleration sensor to acquire vibration signals during operation of the load motor (4) and transmit the signals to a control system; several holes corresponding to positions of the guide posts II (902) are further formed in the bearing seat body II (903); the guide sleeves II (901) are respectively arranged in the holes; the bearing seat body II (903) is arranged above the spring accommodating hole; the guide posts II (902) are respectively inserted into the guide sleeves II (901);

a lower end of the connecting rod II (910) is fixed with the excitation device, and an upper end of the connecting rod II (910) passes through the spring limiting plate II (909) and the spring accommodating hole, and is fixedly connected with the bearing seat body II (903); the spring II (908) is arranged in the spring accommodating hole; the spring II (908) is sleeved on a rod body of the connecting rod II (910); an upper end of the spring II (908) abuts against the bearing seat body II (903), and a lower end of the spring II (908) abuts against the spring limiting plate II (909).

5. An experimental method for simulating no-load dynamic characteristics of a gear transmission system of an electric multiple unit in a wheel-rail excitation environment with the experimental system according to claim 1, comprising the following steps:

assembling the experimental system and checking whether connections in the experimental system are stable;

driving the gear transmission system (8) to forward idle and reverse idle for 10 minutes each at 50% of a rated speed, observing whether there is any abnormal noise in the gear transmission system (8), and determining whether the gear transmission system (8) operates normally;

mounting the torque and speed sensor (12) at a set position, and checking whether signals are acquired by the torque and speed sensor (12) normally;

starting the excitation device;

starting the drive motor (14), driving the gear transmission system (8) to rotate counterclockwise by an output shaft of the drive motor (14); gradually increasing a speed of the drive motor (14) to a speed required by an experiment; starting the load motor (4), setting a rated load torque of the load motor (4) to zero;

during acceleration of the drive motor (14), recording noise, a motor voltage, a motor current and a motor power, as well as a vibration acceleration, a vibration displacement and stress of the gear transmission system (8);

starting the drive motor (14), driving the gear transmission system (8) to rotate clockwise by the output shaft of the drive motor (14); gradually increasing the speed of the drive motor (14) to the speed required by the experiment; starting the load motor (4); and setting the rated load torque of the load motor (4) to zero; and during the acceleration of the drive motor (14), recording the noise, the motor voltage, the motor current and the motor power, as well as the vibration acceleration, the vibration displacement and the stress of the gear transmission system (8).

6. An experimental method for simulating load dynamic characteristics of a gear transmission system of an electric multiple unit in a wheel-rail excitation environment with the experimental system according to claim 1, comprising the following steps:

mounting the torque and speed sensor (12) at a designated position, and checking whether signals are acquired by the torque and speed sensor (12) normally;

starting the excitation device, and thus frequency of the excitation device is increased to the frequency required by the experiment;

starting the drive motor (14), driving the gear transmission system (8) to rotate counterclockwise by an output shaft of the drive motor (14); keeping rated speed unchanged according to requirements of the experiment; starting the load motor (4); and applying a load torque required by the experiment to the gear transmission system (8) by the load motor (4);

recording noise, a motor voltage, a motor current and a motor power, as well as a vibration acceleration, a vibration displacement and stress of the gear transmission system (8) under different load torques;

starting the drive motor (14), driving the gear transmission system (8) to rotate clockwise by the output shaft of the drive motor (14); keeping the rated speed unchanged according to requirements of the experiment; starting the load motor (4); and applying the load torque required by the experiment to the gear transmission system (8) by the load motor (4);

recording the noise, the motor voltage, the motor current and the motor power, as well as the vibration acceleration, the vibration displacement and the stress of the gear transmission system (8) under different load torques;

starting the load motor (4), setting input shaft to rotate counterclockwise, and keeping rated load torque unchanged according to requirements of the experiment; starting the drive motor (14), and enabling the drive motor (14) to run at designated speeds increasing gradually;

recording the noise, the motor voltage, the motor current and the motor power, as well as the vibration acceleration, the vibration displacement and the stress of the gear transmission system (8) under different speeds;

starting the load motor (4), setting the input shaft to rotate clockwise, and keeping the rated load torque unchanged according to requirements of the experiment; starting the drive motor (14), and enabling the drive motor (14) to run at the designated speeds increasing gradually;

recording the noise, the motor voltage, the motor current and the motor power, as well as the vibration acceleration, the vibration displacement and the stress of the gear transmission system (8) under different speeds;

starting the load motor (4), and setting the input shaft to rotate counterclockwise; setting the load motor (4) at a rated load; recording the noise, the motor voltage, the motor current and the motor power, as well as the vibration acceleration, the vibration displacement and the stress of the gear transmission system (8) from a moment that the gear transmission system (8) is started to a moment that the gear transmission system (8) operates stably; and starting the load motor (4), and setting the input shaft to rotate clockwise; setting the load motor (4) at the rated load; recording the noise, the motor voltage, the motor current and the motor power, as well as the vibration acceleration, the vibration displacement and the stress of the gear transmission system (8) from the moment that the system is started to the moment that the system operates stably.

* * * * *